United States Patent [19]

Häfner et al.

[11] 4,013,058
[45] Mar. 22, 1977

[54] RECIPROCATING PISTON ENGINE CONSTRUCTION, PARTICULARLY MULTI-PART CYLINDER AND CRANKSHAFT CONNECTION ARRANGEMENT

[75] Inventors: Reinhard Häfner, Kissing; Karl Wojik; Gerhard Schlenker, both of Augsburg, all of Germany

[73] Assignee: Maschinenfabrik Augsburg-Nurnberg AG, Augsburg, Germany

[22] Filed: Nov. 7, 1974

[21] Appl. No.: 521,695

[30] Foreign Application Priority Data

Nov. 27, 1973 Germany ............................ 2358954

[52] U.S. Cl. ................. 123/195 AC; 123/195 R; 52/79.1; 85/1 JP; 403/408
[51] Int. Cl.$^2$ .................... F02F 1/00; F16B 35/00
[58] Field of Search .... 123/195 R, 195 H, 195 AC, 123/193 C; 403/220, 221, 224, 225, 226, 227, 15, 37, 408; 248/15, 358 R; 52/758 F; 74/583; 85/1 JP

[56] References Cited

UNITED STATES PATENTS

| | | | |
|---|---|---|---|
| 837,767 | 12/1906 | Aims | 52/758 F |
| 2,019,558 | 11/1935 | Brush | 123/195 H |
| 2,846,897 | 8/1958 | Schall | 52/758 F |
| 2,972,240 | 2/1961 | Wood, Sr. | 64/10 |
| 3,320,940 | 5/1967 | Mitchell et al. | 123/195 R |
| 3,362,733 | 1/1968 | Klara | 403/31 |
| 3,493,249 | 2/1970 | Conrad, Jr. et al. | 52/758 F X |
| 3,521,613 | 7/1970 | Celli | 123/195 R |
| 3,541,917 | 11/1970 | Van Douwen et al. | 52/758 F X |

Primary Examiner—C. J. Husar
Assistant Examiner—Tony M. Argenbright
Attorney, Agent, or Firm—Flynn & Frishauf

[57] ABSTRACT

To connect two machine elements which are dynamically loaded by means of tension bolts, the bolts are carried through bores in the machine elements which are somewhat wider than the diameter of the bolts to form a cylindrical chamber, leaving a cylindrical gap surrounding the bolt; the chamber is entirely filled with a damping substance, such as a foamed material, or lubricating oil, particularly pressurized lubricating oil or the like. Preferably, the gap is about 2 to 8 percent of the diameter of the tension bolt, has a length at least three times the diameter of the tension bolt, and is located approximately centered between the points of force application on the tension bolt, to dampen transfer of vibrations, but permit slow bending, below the yield point of the bolt, within the chamber.

18 Claims, 5 Drawing Figures

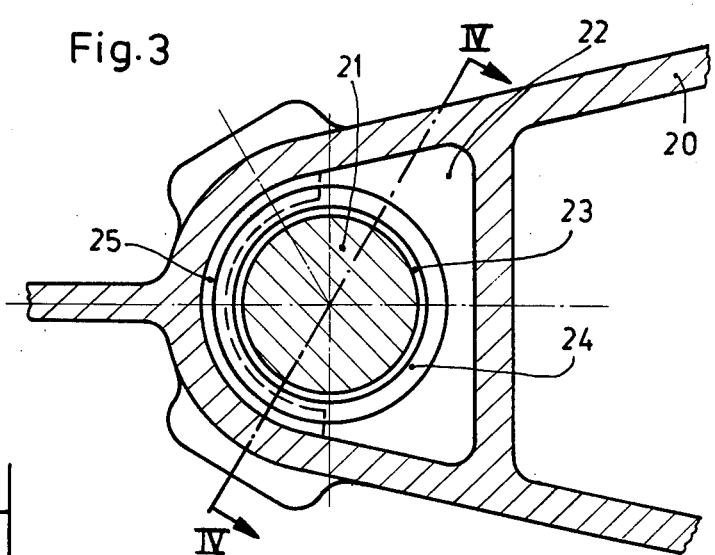
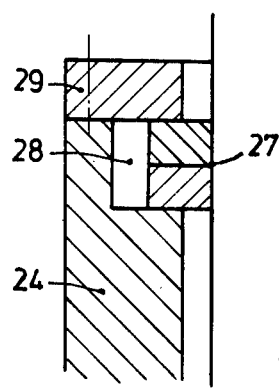
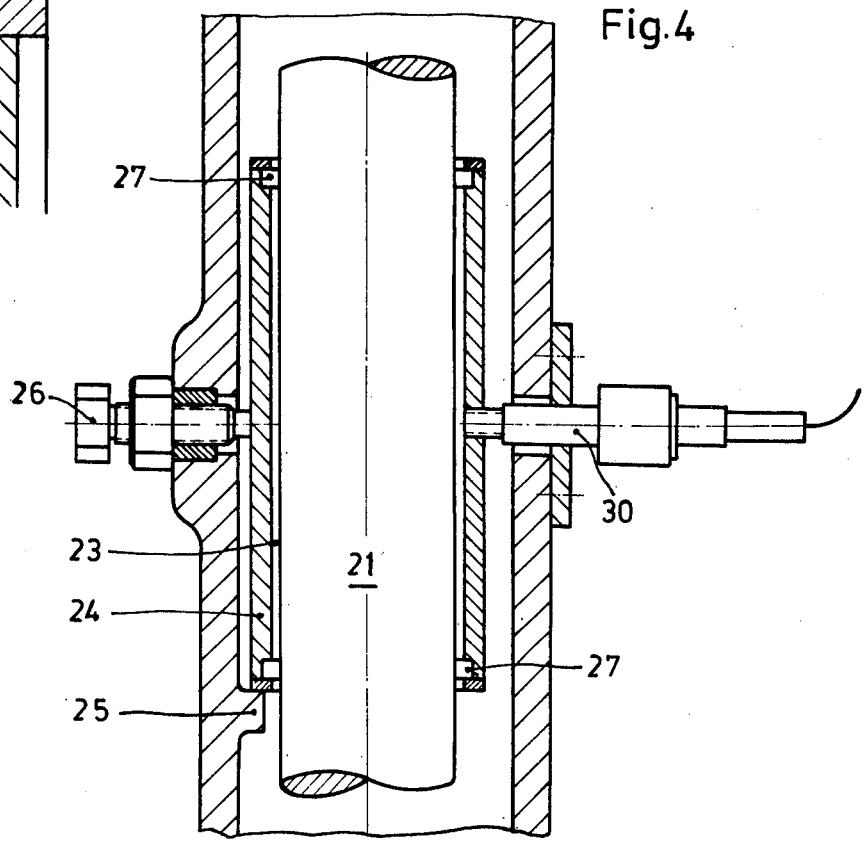

RECIPROCATING PISTON ENGINE CONSTRUCTION, PARTICULARLY MULTI-PART CYLINDER AND CRANKSHAFT CONNECTION ARRANGEMENT

The present invention relates to a reciprocating piston engine construction, and more particularly to the connection arrangement for multi-part cylinder and crankshaft components, as used specifically in large Diesel engines, in which the parts are connected together by means of tension bolts.

The cylinder structure and also the crankshaft bearing and bearing connections of large Diesel engines are usually made as several parts or elements, for ease of casting and machining. It has previously been proposed to connect housings for machine elements by tension bolts, in which separate, superimposed machine elements are joined together along a common junction surface (see German Pat. No. 1,050,600). It has also been proposed to connect the lower bearing half of large motors, such as Diesel engines, with the upper bearing half by means of tension bolts which secure the two bearing halves together (see German Pat. No. 1,268,901).

The tension bolts are stressed dynamically, due to the forces arising in operation of the Diesel engine. The danger arises that the dynamic stress on the tension bolts — which causes movements of the bolts — is subjected to vibration due to the dynamic movement of the surfaces with the machine elements to which the bolts are connected. The surfaces of connection, or the points of force transfer to the tension bolts are dynamically stressed due to the forces arising in operation of the Diesel engine, that is, forces derived from displacement of mass and dissipation of energy due to the explosion of the fuel and air mixture therein and the like. Vibration in the tension bolts is particularly undesirable if the frequency of vibration is such that resonance frequencies of the tension bolts are excited. The tension bolts have inherent reasonant bending frequencies; upon resonance, the tension bolts will be subjected to such excessive vibrations and oscillations that failure of the bolts may result. In addition to vibration being transmitted to the bolts — which might be of a frequency resulting in resonance phenomena — the bolts are subjected to constant low-frequency bending stresses and elongating strains. These bending stresses and elongating strains are below the yield point of the tension bolts. To prevent wear on the tension bolts, and to transfer the design forces, the bolts should be able to absorb the bending stresses and elongating strains, that is, they should be able to follow, by deflection and elongation, the stresses to which they are subjected.

It is an object of the present invention to provide a connection system for machine elements, particularly for the components or parts of a multi-part cylinder construction of large Diesel engines in which oscillations and vibrations in tension bolts are substantially damped without interfering with low-frequency bending or elongation strains.

SUBJECT MATTER OF THE PRESENT INVENTION:

Briefly, the tension bolts are guided in bores in the machine elements which are somewhat larger than the diameter of the tension bolts to leave a cylindrical gap, forming a cylindrical chamber, at least for a portion of the length of the tension bolt. This cylindrical chamber is filled with a damping material which, for example, may be a foam substance, or lubricating oil, and particularly lubricating oil under pressure. As the tension bolt moves due to stresses imposed thereon, it acts on the damping material within the cylindrical gap, that is, within the cylindrical chamber, by displacing the damping material at one side, and forcing it to flow to the other. The damping material exerts a counter force which is particularly effective at rapid movement, that is, at the higher frequencies of oscillation. The counter force of the damping media rises rapidly as the speed of movement rises and effectively dampens oscillations due to natural frequency resonant phenomena. The damping medium does not, however, prevent low-frequency deformation of the tension bolts, such as bending or elongation; such strains may arise without counteracting forces therefrom which inhibit movement of the damping bolt at low frequency. The present invention counteracts vibration without affecting the strength of the tension bolt, in contrast to securely fixing the position of the tension bolt in the housing. It has previously been proposed to securely position the tension bolt in the housing by means of transversely extending set screws. Such set screws, however, cause wear and hence material removal at the tension bolt at the point of engagement with the tension bolt due to relative movement between the tension bolt and the set screws.

When used with internal combustion engines, the damping material preferably is lubricating oil which is continuously supplied to the cylindrical chamber from the central pressurized oil supply. Preferably, a leakage drain point is provided from which leakage fluid can escape. Pressurized positive lubrication circuits with a lubricating pressure pump are present in all large internal combustion engines anyway, so that the present invention can be used with large engines without any substantial additional expense or structural requirements. If the cylindrical chamber is formed by a bore in the housing, through which the tension bolt is passed, then the construction is particularly simple and inexpensive. The ring gap is easily made. The cylindrical gap or chamber is formed roughly centrally between the force engagement points on the tension bolt. Damping is thus obtained at the very region where the highest amplitudes of excursion, upon oscillation, are to be expected.

The invention will be described by way of example with reference to the accompanying drawings, wherein:

FIG. 3 is a horizontal, schematic view through an upright support, which is formed with cross ribs, between which a tension bolt is located;

FIG. 4 is a vertical section along line IV—IV of FIG. 3; and

FIG. 5 is a detail view, to an enlarged scale, of the sealing arrangement of the cylindrical chamber of FIG. 4.

Figure 1:
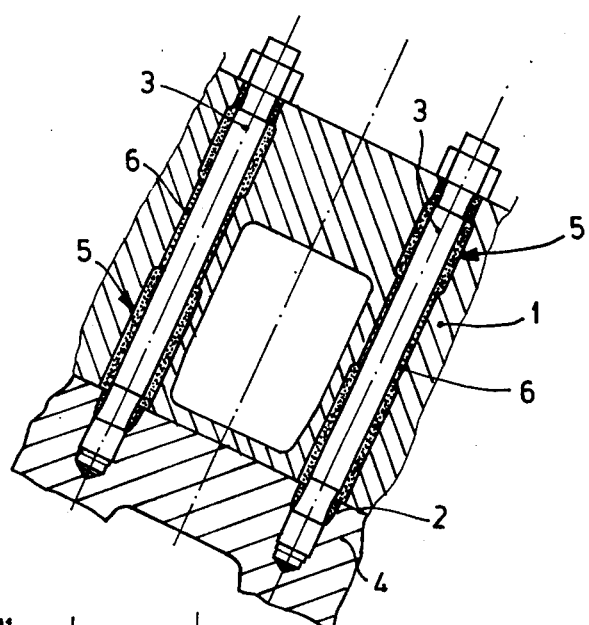
FIG. 1 illustrates, highly schematically, the connection of a cylinder block of a V-engine to the support base thereof.

A cylinder block 1, forming one element or part or component of a machine, such as a V-motor, is connected to the other element, part or component 4 of the V-motor. The two elements 1, 4 are fitted together along a matching, fitted junction surface 2 and are connected by means of tension bolts 3. Tension bolts 3 are located in a bore 5 which may be provided already upon casting the element 1. The central portion of the bore 5 is narrowed to provide a cylindrical gap 6 which forms a cylindrical chamber. To dampen any vibrations which are transferred by the tension bolts 3 between cylinder block 1 and base 4, a tough, tenacious, viscous substance is introduced into the chamber 6 which the tension bolts 3 must displace if it is subjected to vibrations. The damping material, in the present example, is a highly viscous silicone oil filled in the chamber; it is statically retained therein. It is filled into the opening 5, so that the entire bore 5 including the chamber formed by the gap 6 is filled therewith. To obtain effective damping by displacement, the thickness of the gap 6 should be about 2 to 8 percent, preferably about 5 percent of the diameter of the associated tension bolt 6. The length of this cylindrical chamber formed by the gap 6 is at least three times the diameter of the tension bolts 3, preferably about four times the diameter thereof. The chamber 6 is located approximately midway between the points of attachment of the tension bolt, that is, midway between the lower threads of the bolts 3 and the upper nuts.

Figure 2:
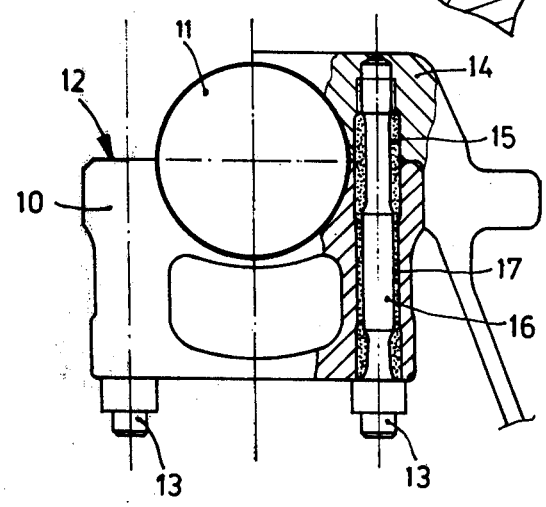
FIG. 2 illustrates connection of a lower bearing block for the crankshaft main bearings of an internal combustion engine.

The crankshaft 11 of an internal combustion engine is supported by a main bearing illustrated in FIG. 2. The lower bearing half is shown at 10, the upper bearing half is shown only in fragmentary illustration (in section) at 14. The components 10, 14 are fitted together at a junction surface 12. The lower component 10 hangs downwardly from the frame structure which includes the upper part 14. The tension bolts 13 are in the form of tension screws. They are located in bores 15 of the bearing top or bearing cover 14. The tension screws 13 are fitted with a cylindrical element 16, located roughly in the middle of their length, to form the gap and chamber 17. The bore 15 and the longitudinally aligned bore formed in the lower component 10 may be cast, and is thereafter preferably machined by being bored to fairly accurate size. Since the width of the chamber and of the gap is not critical (2–8 percent of the diameter of the element located therein), extreme accuracy is not necessary, thus decreasing the cost of the arrangement. To prevent vibrations, the entire bore 15 and with it also the associated gap 17 are filled with a tenacious, viscous foaming substance, such as polyurethane foam. When using foam material with open cells, a viscous fluid may additionally be introduced in the bore 15. A suitable fluid is oil.

The arrangement described in connection with FIGS. 1 and 2, in which the damping material fills the entire length of the bores through which the tension bolts pass, is particularly suitable for smaller tension bolts, since the additional damping material needed is small, and the bore is easily sealed.

In very large structures, such as very large Diesel engines, it is customary to install tension bolts in open, grid-like structures. Referring to FIG. 3, a grid structure 20, with a cross web, has a hollow space 22 therein through which tension bolt 21 passes. The tension bolt 21 is connected to elements of the structure at the bottom and at the top. To form a cylindrical chamber, a sleeve 24 surrounds tension bolt 21. The structure 20 is formed with a part circular projection or shoulder 25, against which sleeve 24 can seat (see FIG. 4). Sleeve 24 is radially fixed within the space 22 by means of a set screws 26; preferably, three set screws are provided located at 120° spacing from each other (see chain-dotted line in FIG. 3, from which a more detailed illustration of the screws 26 has been omitted for clarity). A chamber 23 is axially limited by sealing rings 27, slipped over the tension bolt 21. Preferably, the rings 27 are resilient towards the inside, that is, they seal inwardly against the tension bolt 21, and they are movable with respect to the sleeve 24. FIG. 5 is a detail view of the connection of a such a ring 27. Ring 27, preferably, is split (that is, axially double) as illustrated. Steel or plastic may be used. Ring 27 is inserted in an open groove 28 of sleeve 24, with radial play at the outer circumference. A top holding ring 29 secured, for example by screws (schematically indicated by the vertical chain-dotted line) to sleeve 24 holds the sealing ring 27 in position. The radial play of the ring 27 in the thus formed groove 28 permits movement of the tension bolt 21. Pressurized oil is used as the damping medium. An oil pressure line 30 (omitted from FIG. 3) is connected to sleeve 24 and terminates at the inside thereof, to provide pressurized lubricating oil to the cylindrical chamber between the tension bolt 21 and sleeve 24. Pressurized fluid is obtained from the pressure lubricating circuit of the engine. The seal of the cylindrical chamber 23 in the region of the rings 27 is so arranged that a leakage drain point (or, rather, surface) is provided thereby. Leakage oil which passes through the seal drips down, by gravity, into the oil sump, at the base of the structure 20. Using lubricating oil as the damping medium results in a particularly simple damping system for tension bolts, the vibration of which is otherwise difficult to control. Usually, pressurized lubricating oil is readily available from the pressure lubricating circuit, and in sufficient quantity. It is, of course, also possible to use pressurized oil as the damping medium in the embodiments of FIGS. 1 and 2, by connecting the chambers 6 and 17 to a pressure lubricating circuit by hydraulic connections. Various changes and modifications may be made, and features described in connection with any one of the embodiments may, likewise, be used with any other.

The present invention is not restricted to connecting dynamically loaded separate elements of Diesel engines, or other types of internal combustion engines; rather, the present invention may be used, generally, as a connection arrangement to connect two or more dynamically loaded structural elements which are fitted together along a common junction surface, by providing a cylindrical gap to form a chamber surrounding the tension bolt, in which a damping medium is introduced, as described in detail above.

We claim:

1. Reciprocating piston engine having a multi-part cylinder-crankshaft construction comprising
    at least two separate dynamically loaded structural machine elements (1, 4) fitted together at a common junction surface (2);
    at least two tension bolts (3, 13, 21) passing into aligned bores formed in the machine elements and connecting said machine elements together, and means to dampen vibration and high frequency oscillations
    without interfering with permitted low frequency excursions in the tension bolts upon dynamic loading during operation of the engine comprising
    a cylindrical gap (6, 17, 23) formed in at least one of the machine elements surrounding the bolt (3, 13, 21) throughout at least a portion of its length to provide a cylindrical chamber extending over said at least portion of the length of the bolt;

a liquid damping substance entirely filling said chamber;

and means (30) providing a continuous supply of said liquid substance to compensate for leakage losses thereof.

2. Engine according to claim 1, wherein the damping substance comprises essentially static lubricating oil.

3. Engine according to claim 2, wherein the liquid supply means comprises means (30) continuously providing lubricating oil under pressure, said pressurized lubricating oil being in fluid connection with the cylindrical chamber.

4. Engine according to claim 3, further comprising a leakage drain point in communication with the cylindrical chamber (23) to provide for predetermined leakage positions of pressurized lubricating oil supplied to the chamber.

5. Engine according to claim 4 wherein the engine is Diesel engine and said structural machine elements are portions of the crankshaft housing structure of said diesel engine.

6. Engine according to claim 1, wherein the engine is a Diesel engine and said structural machine elements are portions of a multi-part housing of the engine.

7. Engine according to claim 1, wherein said cylindrical gap has a width of about 2 to 8 percent of the diameter of the tension bolt.

8. Engine according to claim 1, wherein the length of the cylindrical gap, and hence of the cylindrical chamber (6, 17, 23) is at least three times the diameter of the tension bolt (3, 13, 21).

9. Engine according to claim 1, wherein said cylindrical gap forming the cylindrical chamber (6, 17, 23) is located approximately midway of the points of force application on the tension bolt (3, 13, 21).

10. Engine according to claim 1, wherein the cylindrical gap is formed by a bore in at least one of the separate machine elements, the tension bolt (3, 13) passing through said bore.

11. Engine according to claim 1, further comprising a sleeve (24) secured to the tension bolt (21) and surrounding the tension bolt with clearance, the clearance between the inner surface of the sleeve and the outer surface of the tension bolt forming said cylindrically shaped gap, and the space therebetween forming said chamber (23).

12. Engine according to claim 11, further comprising means (26) clamping the sleeve (24) with respect to at least one of the separate machine elements in radial direction.

13. Engine according to claim 11, further comprising sealing means (27) sealing the axial ends of the sleeve (24) against the tension bolt (21) to define the axial ends of said chamber (23), said sealing means permitting radial movement of the tension bolt (21) with respect to the sleeve (24).

14. Engine according to claim 1, further comprising a cylindrical sleeve (16) secured to the tension bolt (15) and fitting tightly thereover, the outer surface of the sleeve (16) and the inner surface of the bore in at least one of the machine elements defining said cylindrical gap.

15. Connection arrangement to connect two dynamically loaded structural elements fitted together at a common junction surface which includes at least two tension bolts clamping said elements together, characterized by means to dampen vibrations and high frequency oscillations without interfering with low frequency excursions of the tension bolts upon dynamic loading of the bolts due to dynamic stresses on the elements comprising a cylindrically shaped gap formed in at least one of the elements surrounding the respective bolt throughout at least a portion of its length to provide a respective cylindrical chamber (6, 17, 23) extending ay least part of the length of the bolt;

a damping liquid surrounding the respective bolt and entirely filling the respective chamber and means (30) providing a continuous supply of said liquid used to compensate for leakage losses.

16. Arrangement according to claim 15, wherein the damping substance comprises oil 17. Arrangement according to claim 15, wherein the width of the cylindrical gap is about 2–8 percent of the diameter of the tension bolt and the length thereof is about at least three times the diameter of the tension bolt, the cylindrical gap being located approximately midway between the points of engagement of force on the tension bolt.

18. Arrangement according to claim 15, wherein the damping substance comprises pressurized lubricating oil.

* * * * *